US011438134B2

(12) United States Patent
Lu

(10) Patent No.: US 11,438,134 B2
(45) Date of Patent: Sep. 6, 2022

(54) PHASE DETECTION METHOD, PHASE DETECTION CIRCUIT, AND CLOCK RECOVERY APPARATUS

(71) Applicant: HUAWEI TECHNOLOGIES CO., LTD., Guangdong (CN)

(72) Inventor: Yuchun Lu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/081,632

(22) Filed: Oct. 27, 2020

(65) Prior Publication Data

US 2021/0044416 A1    Feb. 11, 2021

Related U.S. Application Data

(63) Continuation of application No. PCT/CN2018/121603, filed on Dec. 17, 2018.

(30) Foreign Application Priority Data

Apr. 27, 2018    (CN) .......................... 201810396197.3

(51) Int. Cl.
  *H04L 7/033*    (2006.01)
(52) U.S. Cl.
  CPC .......... *H04L 7/0331* (2013.01); *H04L 7/0334* (2013.01); *H04L 7/0338* (2013.01)
(58) Field of Classification Search
  CPC ............... H04L 25/0214; H04L 25/025; H04L 25/03146; H04L 25/03178; H04L 25/4917;
(Continued)

(56) References Cited

U.S. PATENT DOCUMENTS 6,853,695 B1    2/2005  Betts et al.
8,466,713 B2    6/2013  Stojanovic et al.
(Continued)

FOREIGN PATENT DOCUMENTS

CN    1464636 A    12/2003
CN    1685656 A    10/2005
(Continued)

OTHER PUBLICATIONS

Aurangozeb, C. R. Dick, M. Mohammad and M. Hossain, "Sequence-Coded Multilevel Signaling for High-Speed Interface," in IEEE Journal of Solid-State Circuits, vol. 55, No. 1, pp. 27-37, Jan. 2020, doi: 10.1109/JSSC.2019.2941016. (Year: 2020).*
(Continued)

*Primary Examiner* — Nader Bolourchi
(74) *Attorney, Agent, or Firm* — Fish & Richardson P.C.

(57) ABSTRACT

Embodiments of this application disclose example phase detection methods, phase detection circuits, and clock recovery apparatuses. One example method includes receiving a first signal and deciding a (2M−1) level of the first signal to obtain a decision result, where the first signal is a (2M−1)-level signal, and M is a positive integer. A response amplitude parameter of a transmission channel can then be obtained. Clock phase information in the first signal can then be extracted based on the first signal, the decision result, and the response amplitude parameter. Output clock phase information can then be determined based on at least three decision results and at least three pieces of clock phase information in at least three symbol periods.

8 Claims, 7 Drawing Sheets

(58) Field of Classification Search
CPC ... H04L 7/0004; H04L 7/0025; H04L 7/0058; H04L 7/0062; H04L 7/0331; H04L 7/0334; H04L 7/0338
See application file for complete search history.

(56) References Cited

U.S. PATENT DOCUMENTS

| | | | |
|---|---|---|---|
| 8,649,476 | B2 | 2/2014 | Malipatil et al. |
| 8,693,596 | B1 | 4/2014 | Warner et al. |
| 8,942,334 | B1 | 1/2015 | Zortea et al. |
| 9,712,349 | B1 | 7/2017 | Lu et al. |
| 2006/0023827 | A1* | 2/2006 | Sanders .............. H04L 7/033 375/376 |
| 2010/0329323 | A1 | 12/2010 | Hsu |
| 2012/0161538 | A1 | 6/2012 | Kinoshita et al. |
| 2015/0188693 | A1* | 7/2015 | Giaconi .............. H04L 7/0058 375/233 |
| 2015/0215138 | A1 | 7/2015 | Dorman et al. |

FOREIGN PATENT DOCUMENTS

| | | |
|---|---|---|
| CN | 102480446 A | 5/2012 |
| CN | 105794144 A | 7/2016 |
| WO | 2016012036 A1 | 1/2016 |
| WO | 2017143509 A1 | 8/2017 |

OTHER PUBLICATIONS

K. Azadet, Meng-Lin Yu, P. Larsson and D. Inglis, "A gigabit transceiver chip set for UTP CAT-6 cables in digital CMOS technology," 2000 IEEE International Solid-State Circuits Conference. Digest of Technical Papers (Cat. No. 00CH37056), 2000, pp. 306-307, doi: 10.1109/ISSCC.2000.839792. (Year: 2000).*

Dokania et al., "A 5.9pJ/bit 10Gb/s Serial Link with Unequalized MM-CDR in 14nm Tri-gate CMOS" 2015 IEEE International Solid-State Circuits Conference, 3 pages.

PCT International Search Report and Written Opinion in International Application No. PCT/CN2018/121,603, dated Feb. 27, 2019, 14 pages (With English Translation).

Office Action issued in Chinese Application No. 201810396197.3 dated Apr. 6, 2021, 9 pages (with English translation).

Extended European Search Report issued in European Application No. 18916020.3 dated May 7, 2021, 8 pages.

* cited by examiner

PHASE DETECTION METHOD, PHASE DETECTION CIRCUIT, AND CLOCK RECOVERY APPARATUS

CROSS-REFERENCE TO RELATED APPLICATIONS

This application is a continuation of International Application No. PCT/CN2018/121603, filed on Dec. 17, 2018, which claims priority to Chinese Patent Application No. 201810396197.3, filed on Apr. 27, 2018. The disclosures of the aforementioned applications are hereby incorporated by reference in their entireties.

TECHNICAL FIELD

The present invention relates to the field of communications technologies, and in particular, to a phase detection method, a phase detection circuit, and a clock recovery apparatus.

BACKGROUND

In a data communication (especially high-speed serial data communication) process, to reduce overheads, usually only a data signal is transmitted, and a clock signal that is synchronous with the data signal is not transmitted. In this case, to ensure that the data signal can be completely recovered at a receive end, the receive end needs to generate a clock signal by using an approximate reference frequency, and then align the generated clock signal and the data signal in phase by using a phase-locked loop (PLL). This process is called clock data recovery (CDR).

Currently, technical solutions for implementing CDR have been widely studied. However, in an existing technical solution, a stable phase detection gain cannot be achieved when a clock phase is tuned to a pulse response edge.

SUMMARY

A technical problem that needs to be resolved in this application is how to achieve a stable phase detection gain when a clock phase is tuned to a pulse response edge.

According to a first aspect, a clock recovery apparatus is provided. The clock recovery apparatus may be specifically applied to any receiver that needs to perform clock recovery on a received signal. The clock recovery apparatus includes a continuous time linear equalization circuit, an analog-to-digital conversion circuit, a feedforward equalization circuit, an equalization circuit, a calibration circuit, a decoding circuit, a phase detection circuit, an adaptive circuit, a majority vote circuit, a digital loop filter circuit, and a phase interpolation circuit.

The continuous time linear equalization circuit is configured to: receive an input signal sent by a transmitter, and perform continuous time linear equalization on the input signal to obtain a linear equalized signal, where the input signal is an M-level signal, and M is a positive integer.

The analog-to-digital conversion circuit is configured to: receive the linear equalized signal, and perform sampling on the linear equalized signal to obtain a sampled signal.

The feedforward equalization circuit is configured to perform forward equalization on the sampled signal to obtain a forward equalized signal, where the forward equalized signal is a (2M−1)-level signal.

The equalization circuit is configured to perform equalization on the sampled signal to obtain a first equalized signal.

The decoding circuit is configured to: decode the first equalized signal to obtain a first decoded signal, and calculate a transmission performance parameter of the first decoded signal.

The calibration circuit is configured to: obtain at least three historical phase offset parameters and transmission performance information corresponding to each historical phase offset parameter, compare the obtained transmission performance information, and determine a historical phase offset parameter corresponding to optimal transmission performance information as a phase offset parameter, where the transmission performance information includes a signal-to-noise ratio or a bit error rate.

The phase detection circuit is configured to decide a (2M−1) level of the forward equalized signal to obtain a decision result.

The phase detection circuit is further configured to determine signal error information based on the forward equalized signal, the decision result, and a historical response amplitude parameter.

The adaptive circuit is configured to determine a response amplitude parameter of a transmission channel based on the signal error information.

The phase detection circuit is further configured to extract clock phase information in the forward equalized signal based on the forward equalized signal, the decision result, the response amplitude parameter, and the phase offset parameter.

The phase detection circuit is further configured to determine output clock phase information based on at least three decision results and at least three pieces of clock phase information in at least three symbol periods.

The majority vote circuit is configured to take a majority vote on the output clock phase information to obtain target clock phase information.

The digital loop filter circuit is configured to perform low-pass filtering on the target clock phase information to obtain absolute clock phase information.

The phase interpolation circuit is configured to perform a phase interpolation operation on the absolute clock phase information to generate a clock signal, where the clock signal is used to control the analog-to-digital conversion circuit to perform sampling on the linear equalized signal.

It can be learned that this application provides the clock recovery apparatus that includes the phase detection circuit, where the phase detection circuit extracts the clock phase information based on the forward equalized signal, the decision result, the response amplitude parameter of the transmission channel, and the phase offset parameter, and determines the output clock phase information based on the at least three decision results and the at least three pieces of clock phase information in the at least three symbol periods. The phase detection circuit can achieve a stable phase detection gain when a clock phase is tuned to a pulse response edge, so that the clock recovery apparatus can automatically lock the pulse response edge stably at a receive end.

According to a second aspect, this application provides a phase detection method, where the method may be specifically applied to the phase detection circuit according to the first aspect, and the method includes:

receiving a first signal, and deciding a (2M−1) level of the first signal to obtain a decision result, where the first signal is a (2M−)-level signal, and M is a positive integer;

obtaining a response amplitude parameter of a transmission channel;

extracting clock phase information in the first signal based on the first signal, the decision result, and the response amplitude parameter: and determining output clock phase information based on at least three decision results and at least three pieces of clock phase information in at least three symbol periods.

It can be learned that this application provides the phase detection method in which the clock phase information is extracted based on the first signal, the decision result, and the response amplitude parameter of the transmission channel; and the output clock phase information is determined based on the at least three decision results and the at least three pieces of clock phase information in the at least three symbol periods. In this way, a stable phase detection gain can be achieved when a clock phase is tuned to a pulse response edge.

In an optional implementation, the obtaining a response amplitude parameter of a transmission channel specifically includes:

obtaining a preconfigured response amplitude parameter of the transmission channel from the phase detection circuit.

In an optional implementation, the obtaining a response amplitude parameter of a transmission channel specifically includes:

determining signal error information based on the first signal, the decision result, and a historical response amplitude parameter, and outputting the signal error information; and obtaining a response amplitude parameter that is of the transmission channel and that is determined based on the signal error information.

In an optional implementation, the extracting clock phase information in the first signal based on the first signal, the decision result, and the response amplitude parameter specifically includes:

obtaining a phase offset parameter, where the phase offset parameter is used to tune the clock phase information; and extracting the clock phase information in the first signal based on the first signal, the decision result, the response amplitude parameter, and the phase offset parameter.

In an optional implementation, the obtaining a phase offset parameter specifically includes:

obtaining a preconfigured phase offset parameter from the phase detection circuit.

In an optional implementation, the obtaining a phase offset parameter specifically includes:

obtaining a phase offset parameter that is determined based on at least three historical phase offset parameters and transmission performance information corresponding to each historical phase offset parameter, where the transmission performance information includes a signal-to-noise ratio or a bit error rate.

In an optional implementation, the deciding a (2M−1) level of the first signal to obtain a decision result specifically includes:

determining a decision threshold based on the response amplitude parameter; and deciding the (2M−1) level of the first signal based on the decision threshold to obtain the decision result, where the decision result is an element in a preset decision set, and the preset decision set is $\{-(M-1), -(M-2), \ldots, 0, \ldots, +(M-2), +(M-1)\}$.

In an optional implementation, the first signal is a signal obtained by performing forward equalization on a second signal, and the second signal is an M-level signal.

In an optional implementation, the second signal is a signal obtained by performing sampling on a third signal, and the third signal is a modulated signal obtained through M-ary modulation.

In an optional implementation, the output clock phase information is processed to generate a clock signal, and the clock signal is used to control sampling on the third signal to obtain the second signal.

It can be learned that this application provides the phase detection method in which the clock phase information is extracted based on the first signal, the decision result, the response amplitude parameter of the transmission channel, and the phase offset parameter; and the output clock phase information is determined based on the at least three decision results and the at least three pieces of clock phase information in the at least three symbol periods. In this way, a stable phase detection gain can be achieved when a clock phase is tuned to a pulse response edge.

According to a third aspect, a phase detection circuit is provided. The phase detection circuit has functions for implementing the second aspect or the possible implementations of the second aspect, and may be specifically applied to any receiver that needs to perform phase detection on a received signal. The functions may be implemented by hardware or may be implemented by hardware executing corresponding software. The hardware or software includes one or more modules corresponding to the foregoing functions. The module may be software and/or hardware. Based on the same inventive concept, for a problem-resolving principle and beneficial effects of the phase detection circuit, reference may be made to the second aspect, the possible method implementations of the second aspect, and the beneficial effects thereof. Therefore, for implementations of the phase detection circuit, reference may be made to the second aspect and the possible method implementations of the second aspect. Repeated content is not described herein again.

According to a fourth aspect, a phase detection circuit is provided. The phase detection circuit includes: a memory, configured to store one or more computer programs, where the computer program includes a program instruction; and a processor, configured to invoke the program instruction stored in the memory to implement the solution in the method design of the second aspect. For problem resolving implementations and beneficial effects of the phase detection circuit, refer to the second aspect, the possible method implementations of the second aspect, and the beneficial effects thereof. Repeated content is not described herein again.

According to a fifth aspect, a computer readable storage medium is provided. The computer storage medium stores a computer program, and the computer program includes a program instruction. When the program instruction is executed by a processor, the processor is enabled to perform the method according to the second aspect and the possible method implementations of the second aspect. Beneficial effects thereof are the same. Repeated content is not described herein again.

DESCRIPTION OF EMBODIMENTS

The following describes the embodiments of the present invention with reference to the accompanying drawings in the embodiments of the present invention.

Figure 1:
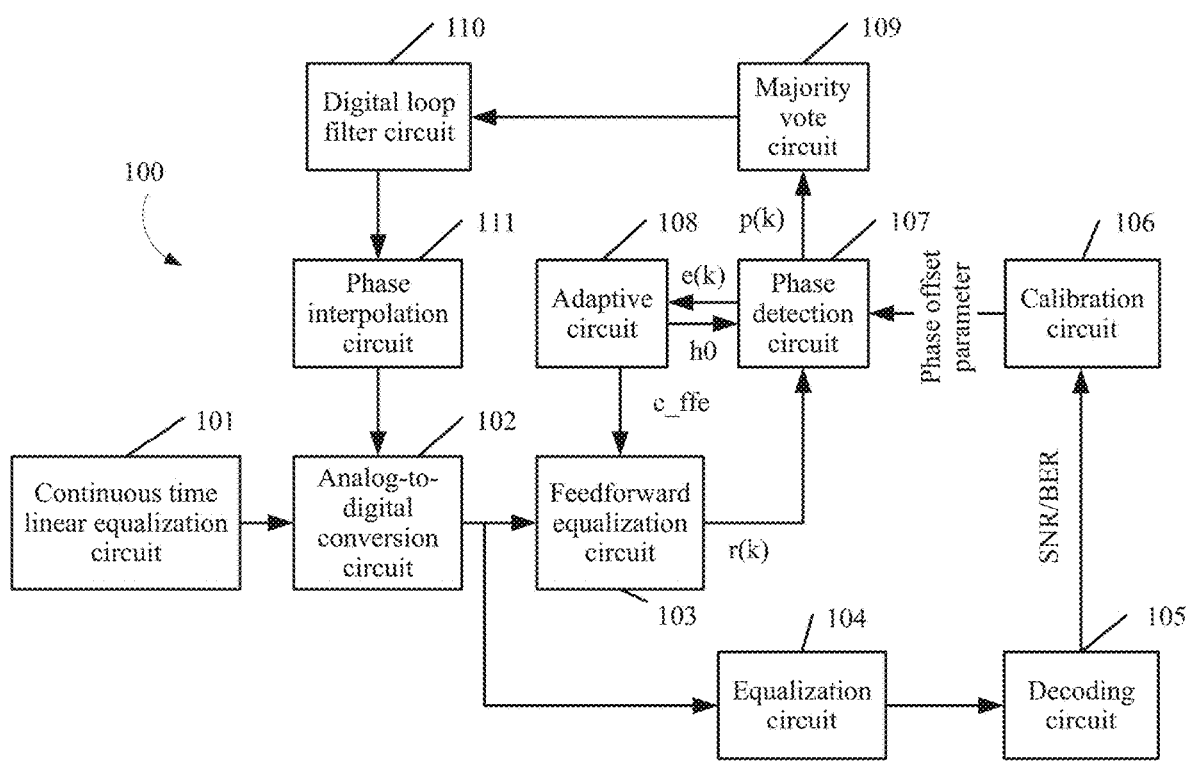
FIG. 1 is a schematic block diagram of a clock recovery apparatus 100 according to an embodiment of this application.

FIG. 1 is a schematic block diagram of a clock recovery apparatus 100 according to an embodiment of this application. The clock recovery apparatus 100 may be specifically applied to any receiver that needs to perform clock recovery on a received signal. The receiver may be applied to any system that requires a high-speed serial communications interface, for example, a chip serializer/deserializer (SerDes) interface, a CDR chip in an optical module, an Ethernet interface, an optical transport network (OTN) interface, a bus and interface standard (Peripheral Component Interface Express, PCIE) interface, a general-purpose computer interface, and a mobile phone interface.

As shown in FIG. 1, the clock recovery apparatus 100 may include a continuous time linear equalization (CTLE) circuit 101, an analog-to-digital conversion (ADC) circuit 102, a feedforward equalization (FFE) circuit 103, an equalization circuit (Equalizer) 104, a calibration circuit (Calibrator) 106, a decoding circuit (Decoder) 105, a phase detection circuit 107, an adaptive circuit 108, a majority vote (MV) circuit 109, a digital loop filter (DLF) circuit 110, and a phase interpolation (PI) circuit 111.

The continuous time linear equalization circuit 101 is configured to: receive an input signal sent by a transmitter, perform continuous time linear equalization on the input signal to obtain a linear equalized signal, and output the linear equalized signal to the analog-to-digital conversion circuit 102. The input signal is an M-level signal transmitted to the receiver by the transmitter, and M is a positive integer. For example, the input signal may be a modulated signal obtained through M-ary modulation, for example, a PAM-M signal obtained through M-ary pulse amplitude modulation (PAM). Certainly, the input signal may alternatively be a modulated signal obtained through M-ary modulation in another manner. For another example, the input signal may alternatively be a baseband signal, for example, non-return to zero (NRZ) code. In this case, because the NRZ code is a binary signal, M is 2.

The analog-to-digital conversion circuit 102 is configured to: receive the linear equalized signal sent by the continuous time linear equalization circuit 101, perform sampling on the linear equalized signal to obtain a sampled signal, and output the sampled signal to the feedforward equalization circuit 103. In an implementation of this application, the analog-to-digital conversion circuit 102 may perform baud rate sampling on the linear equalized signal to obtain the sampled signal. Certainly, in another implementation, the analog-to-digital conversion circuit 102 may alternatively perform sampling on the linear equalized signal in another manner to obtain the sampled signal.

The feedforward equalization circuit 103 is configured to: receive the sampled signal sent by the analog-to-digital conversion circuit 102, perform forward equalization on the sampled signal to obtain a forward equalized signal r(k), and output the forward equalized signal r(k) to the phase detection circuit 107. It should be noted that the feedforward equalization circuit 103 can implement a (1+D) filtering effect for any response channel. In other words, implementing the (1+D) filtering effect for any response channel can filter the response channel into a (I+D) channel. Inter-symbol interference (ISI) of a post 1 tap is retained in the (1+D) channel, and an amplitude of the post 1 tap is the same as an amplitude of a transmitted signal. In the (1+D) channel, an M-level signal is converted into a (2M−1)-level signal. Therefore, the forward equalized signal r(k) is a (2M−1)-level signal.

In an implementation of this application, the analog-to-digital conversion circuit 102 is further configured to output the sampled signal to the equalization circuit 104, as shown in FIG. 1.

In this implementation, the equalization circuit 104 is configured to: receive the sampled signal sent by the analog-to-digital conversion circuit 102, perform equalization on the sampled signal to obtain a first equalized signal, and perform sequence detection on the first equalized signal to identify a first transmission sequence. In this embodiment of this application, the equalization circuit 104 may perform sequence detection on the first equalized signal by using a maximum likelihood sequence estimation algorithm, to identify the first transmission sequence. Certainly, in another embodiment, the equalization circuit 104 may alternatively perform sequence detection on the first equalized signal by using another method, to identify the first transmission sequence.

In an optional implementation, the equalization circuit 104 is further configured to output the first transmission sequence to the decoding circuit 105, as shown in FIG. 1.

The decoding circuit 105 is configured to: receive the first transmission sequence sent by the equalization circuit 104, decode the first transmission sequence to obtain a first decoded signal, calculate a transmission performance parameter of the first decoded signal, and output the transmission performance parameter to the calibration circuit 106. The decoding circuit 105 may be a forward error correction (FEC) decoder.

In another optional implementation, the equalization circuit 104 is further configured to: calculate a transmission performance parameter of the first transmission sequence, and output the transmission performance parameter to the calibration circuit 106.

In another implementation of this application, the feedforward equalization circuit 103 is further configured to output the forward equalized signal r(k) to the equalization circuit 104.

In this implementation, the equalization circuit 104 is configured to: receive the forward equalized signal r(k) sent by the feedforward equalization circuit 103, perform equalization on the received forward equalized signal r(k) to obtain a second equalized signal, and perform sequence detection on the second equalized signal to identify a second transmission sequence.

In an optional implementation, the equalization circuit 104 is further configured to output the second transmission sequence to the decoding circuit 105.

The decoding circuit 105 is configured to: receive the second transmission sequence sent by the equalization circuit 104, decode the second transmission sequence to obtain a second decoded signal, calculate a transmission performance parameter of the second decoded signal, and output the transmission performance parameter to the calibration circuit 106.

In another optional implementation, the equalization circuit 104 is further configured to: calculate a transmission performance parameter of the second transmission sequence, and output the transmission performance parameter to the calibration circuit 106.

It should be noted that when the equalization circuit 104 performs equalization on the forward equalized signal r(k), that is, the equalization circuit 104 performs equalization on an output signal of the feedforward equalization circuit 103, the equalization circuit 104 may reuse some equalization capabilities of the feedforward equalization circuit 103. In this case, the clock recovery apparatus 100 supports a maximum likelihood sequence estimation algorithm implementation of two taps. The clock recovery apparatus 100 may lock a channel response in a (1+D) form.

When the equalization circuit 104 performs equalization on the sampled signal, in other words, when the equalization circuit 104 performs equalization on an output signal of the analog-to-digital conversion circuit 102, the clock recovery apparatus 100 can support longer ISI, in other words, the clock recovery apparatus 100 can support a maximum likelihood sequence estimation algorithm implementation of a plurality of taps.

The calibration circuit 106 is configured to receive a transmission performance parameter.

In an implementation of this application, when performing the operation of receiving a transmission performance parameter, the calibration circuit 106 may be specifically configured to receive the transmission performance parameter sent by the equalization circuit 104.

In another implementation of this application, when performing the operation of receiving a transmission performance parameter, the calibration circuit 106 may be specifically configured to receive the transmission performance parameter sent by the decoding circuit 105.

The calibration circuit 106 is further configured to: obtain at least three historical phase offset parameters and transmission performance information corresponding to each historical phase offset parameter, compare the obtained transmission performance information, determine a historical phase offset parameter corresponding to optimal transmission performance information as a phase offset parameter offset, and output the phase offset parameter offset to the phase detection circuit 107. In this embodiment of this application, when the transmission performance information is an SNR the optimal transmission performance information is a highest SNR or when the transmission performance information is a BER, the optimal transmission performance information is a lowest BER.

It should be noted that in this embodiment of this application, the historical phase offset parameters are determined by the calibration circuit 106 and stored in the calibration circuit 106, and the transmission performance information corresponding to each historical phase offset parameter is obtained from the equalization circuit 104 or the decoding circuit 105 by the calibration circuit 106 and stored in the calibration circuit 106.

The phase detection circuit 107 is configured to: receive the forward equalized signal r(k) sent by the feedforward equalization circuit 103, and decide a (2M−1) level of the forward equalized signal r(k) to obtain a decision result s(k).

In this embodiment of this application, the decision result s(k) is an element in a preset decision set, and the preset decision set is {−(M−1), −(M−2), . . . , 0, . . . , +(M−2), +(M−1)}.

For example, when M is 2, the preset decision set is {−1, 0, +1}. To be specific, in any decision, the decision result is one of −1, 0, and +1.

For another example, when M is 4, the preset decision set is {−3, −2, −1, 0, +1, +2, +3}. To be specific, in any decision, the decision result is one of −3, −2, −1, 0, +1, +2, and +3.

The phase detection circuit 107 is further configured to obtain a response amplitude parameter h0 of a transmission channel.

In this embodiment of this application, the transmission channel is a link through which the transmitted signal passes when the transmitted signal is transmitted from a signal transmit end (the transmitter) to the phase detection circuit. The link may be an electrical link such as a printed circuit board (PCB) or a coaxial cable, or may be an optical link or a wireless link. It should be noted that the phase detection method according to this embodiment of this application may be specifically applied to a scenario that requires high-speed interconnection. In other words, the link may be an inter-chip, inter-board, or inter-system high-speed interconnection link; or the link may be an interconnection link between a chip and an optical module or even an optical link between optical modules. It can be learned from the foregoing descriptions that in this embodiment of this application, the transmission channel may be the foregoing (1+D) channel.

In an implementation of this application, when performing the operation of obtaining a response amplitude parameter h0 of a transmission channel, the phase detection circuit 107 may be specifically configured to obtain a preconfigured response amplitude parameter h0 of the transmission channel from the phase detection circuit 107.

In this implementation, when performing the operation of deciding a (2M−1) level of the forward equalized signal r(k) to obtain a decision result s(k), the phase detection circuit 107 may be specifically configured to: determine a decision threshold based on the response amplitude parameter h0, and decide the (2M−1) level of the forward equalized signal r(k) based on the decision threshold, to obtain the decision result s(k).

The decision threshold may include −(2M−3)/(2(M−1))*h0, −(2M−5)(2(M−1))*h0, . . . , +(2M−5)/(2(M−1))*h0, and +(2M−3)/(2(M−1))*h0.

For example, when M is 2, the decision threshold includes −h0/2 and +h0/2. When a value of the first signal is less than −h0/2, the decision result is −1; when a value of the first signal is greater than +h0/2, the decision result is +1; or when a value of the first signal is greater than −h0/2 and less than +h0/2, the decision result is 0.

For another example, when M is 4, the decision threshold includes −5/6*h0, −3/6*h0, −1/6*h0, +1/6*h0, +3/6*h0, and +5/6*h0. When a value of the first signal is less than −5/6*h0, the decision result is −3; when a value of the first signal is greater than −5/6*h0 and less than −3/6*h0, the decision result is −2; when a value of the first signal is greater than −3/6*h0 and less than −1/6*h0, the decision result is −1: when a value of the first signal is greater than −1/6*h0 and less than +1/6*h0, the decision result is 0; when a value of the first signal is greater than +1/6*h0 and less than +3/6*h0, the decision result is +1; when a value of the first signal is greater than +3/6*h0 and less than +4/6*h0, the decision result is +2; or when a value of the first signal is greater than +5/6*h0, the decision result is +3.

In another implementation of this application, when performing the operation of obtaining a response amplitude parameter h0 of a transmission channel, the phase detection circuit 107 may be specifically configured to receive a response amplitude parameter h0 sent by the adaptive circuit 108.

In this implementation, when performing the operation of deciding a (2M−1) level of the forward equalized signal r(k) to obtain a decision result s(k), the phase detection circuit 107 may be specifically configured to: obtain a historical response amplitude parameter and determine a decision threshold based on the historical response amplitude parameter; and decide the (2M−1) level of the forward equalized signal r(k) based on the decision threshold, to obtain the decision result s(k).

In this implementation, in a first symbol period, the historical response amplitude parameter may be an initial response amplitude parameter preconfigured in the phase detection circuit 107; and in an $N^{th}$ symbol period, the historical response amplitude parameter may be a response amplitude parameter in an $(N-1)^{th}$ symbol period, where N is a positive integer greater than 1.

The phase detection circuit 107 is further configured to: determine signal error information e(k) based on the forward equalized signal r(k), the decision result s(k), and the historical response amplitude parameter; and output the signal error information e(k) to the adaptive circuit 108.

The adaptive circuit 108 is configured to: receive the signal error information e(k) sent by the phase detection circuit 107, determine the response amplitude parameter h0 of the transmission channel based on the signal error information e(k), and send the response amplitude parameter h0 to the phase detection circuit 107.

In this embodiment of this application, the adaptive circuit 108 may determine (or estimate) the response amplitude parameter h0 by using an adaptive algorithm such as a least mean square (LMS) algorithm.

After receiving the response amplitude parameter h0 sent by the adaptive circuit 108, the phase detection circuit 107 is further configured to store the response amplitude parameter h0. It can be understood that in a next symbol period, the stored response amplitude parameter h0 becomes a new historical response amplitude parameter.

The phase detection circuit 107 is further configured to obtain a phase offset parameter offset.

In an implementation of this application, when performing the operation of obtaining a phase offset parameter offset, the phase detection circuit 107 may be specifically configured to obtain a preconfigured phase offset parameter offset from the phase detection circuit 107.

In another implementation of this application, when performing the operation of obtaining a phase offset parameter offset, the phase detection circuit 107 may be specifically configured to receive the phase offset parameter offset that is sent by the calibration circuit 106 and that is determined based on the at least three historical phase offset parameters and the transmission performance information corresponding to each historical phase offset parameter.

The phase detection circuit 107 is further configured to extract clock phase information c(k) in the forward equalized signal r(k) based on the forward equalized signal r(k), the decision result s(k), the response amplitude parameter h0, and the phase offset parameter offset.

In an implementation of this application, the clock phase information c(k) may be calculated according to the following formula: c(k)=+/−sign(r(k)−s(k)*h0/(M−1)+/−offset), where sign(r(k)−s(k)*h0(M−1)) represents a sign determining operation on r(k)−s(k)*h0(M−1). It should be noted that whether a result of the sign determining operation and the phase offset parameter offset are positive or negative specifically depends on an actual situation. Certainly, in another implementation, the clock phase information c(k) may be alternatively extracted in another manner based on the first signal r(k), the decision result s(k), the response amplitude parameter h0, and the phase offset parameter offset.

In this embodiment of this application, values +1, 0, and −1 of the clock phase information c(k) respectively represent early, hold, and late states indicated by the clock phase information c(k). It can be understood that the clock phase information c(k) is relative phase information.

The phase detection circuit 107 is further configured to: determine output clock phase information p(k) based on at least three decision results and at least three pieces of clock phase information in at least three symbol periods, and output the output clock phase information p(k) to the majority vote circuit 109.

In this embodiment of this application, when performing the operation of determining output clock phase information p(k) based on at least three decision results and at least three pieces of clock phase information in at least three symbol periods, the phase detection circuit 107 may be specifically configured to: use the decision result as address information, and extract the output clock phase information p(k) from the at least three pieces of clock phase information in the at least three symbol periods or a combination thereof (that is, of the at least three pieces of clock phase information) based on the at least three decision results in the at least three symbol periods.

In an implementation of this application, the phase detection circuit 107 determines the output clock phase information p(k) based on three decision results and three pieces of clock phase information in three adjacent symbol periods. For ease of description, in this embodiment of this application, a rule for determining the output clock phase information p(k) is illustratively described by using an example in which a value of the phase offset parameter offset is 0. In this implementation, when M is 2, that is, when the first signal r(k) is a 3-level signal, the rule for determining the output clock phase information p(k) may be shown in Table 1.

TABLE 1

| s(z − 1) | s(z) | s(z + 1) | P(k) |
|---|---|---|---|
| −1 | 0 | 0 | +sign[r(z)/ − sign[r(z + 1)] |
| +1 | 0 | 0 | −sign[r(z)]/ + sign|r(z + 1)] |
| 0 | 0 | −1 | +sign[r(z − 1) ]/ − sign[r(z)] |
| 0 | 0 | +1 | −sign|r(z − 1)]/ + sign[r(z)] |
| 0 | +1 | 0 | +sign[r(z − 1)]/ − sign[r(z + 1)] |
| 0 | −1 | 0 | −sign[r(z − 1)]/ + sign[r(z + 1)] |
| −1 | 0 | +1 | +sign[r(z)] |
| +1 | 0 | −1 | −sign|r(z)] |
| 0 | +1 | +1 | +sign[r(z − 1)] |
| 0 | −1 | −1 | −sign|r(z − 1)] |
| +1 | +1 | 0 | +sign[r(z + 1)] |
| −1 | −1 | 0 | −sign|r(z + 1)] |
| | Others | | 0 |

When M is 4, that is, when the first signal r(k) is a 7-level signal, the rule for determining the output clock phase information p(k) may be shown in Table 2. As shown in Table 1 or Table 2, s(z−1), s(z), and s(z+1) respectively represent three decision results in three adjacent symbol periods.

TABLE 2

| s(z − 1) | s(z) | s(z + 1) | P(k) |
|---|---|---|---|
| <t | t | t | +sign[r(z) − t/3*h0]/ − sign[r(z + 1) − 1/3*h0] |
| >t | t | t | −sign[r(z) − t/3*h0]/ + sign[r(z + 1) − t/3*h0] |
| t | t | <t | +sign[r(z − 1) − t/3*h0]/ − sign[r(z) − t/3*h0] |
| t | t | >t | sign[r(z − 1) − t/3*h0]/ + sign[r(z) − t/3*h0] |
| <t | t | <t | +sign[r(z − 1) − p/3*h0]/ − sign[r(z + 1) − q/3*h0] |
| >t | t | >t | −sign[r(z − 1) − p/3*h0]/ + sign[r(z + 1) − q/3*h0] |
| <t | t | >t | +sign[r(z) − t/3*h0] |
| >t | t | <t | ~sign[r(z) − t/3*h0] |
| <+3 | +3 | +3 | +sign[r(z − 1) − p/3*h0] |
| >−3 | −3 | −3 | −sign[r(z − 1) − p/3*h0] |
| +3 | +3 | <+3 | +sign[r(z + 1) − q/3*h0] |
| −3 | −3 | q>−3 | −sign[r(z + 1) − q/3*h0] |
|  | Others |  | 0 | t = −2, −1, 0, +1, +2

It should be noted that the rule for determining the output clock phase information p(k) shown in Table 1 or Table 2 is merely a specific example provided in this embodiment of this application. In another embodiment, the output clock phase information p(k) may be alternatively determined in another manner based on the at least three decision results and the at least three pieces of clock phase information in the at least three symbol periods.

The majority vote circuit 109 is configured to: receive the output clock phase information p(k) sent by the phase detection circuit 107, take a majority vote on the output clock phase information p(k) to obtain target clock phase information, and output the target clock phase information to the digital loop filter circuit 110. It can be understood that when receiving a plurality of p(k) in a specified quantity, the majority vote circuit 109 takes a majority vote on the plurality of p(k) to obtain the target clock phase information.

In an implementation of this application, a specific manner in which the majority vote circuit 109 takes a majority vote on p(k) to obtain the target clock phase information may be as follows: when a quantity of phase early states in p(k) is greater than a sum of a quantity of phase hold states in p(k), the majority vote circuit 109 uses phase early as the target clock phase information; when a quantity of phase late states in p(k) is greater than a sum of a quantity of phase early states in p(k) and a quantity of phase hold states in p(k), the majority vote circuit 109 uses phase late as the target clock phase information; or when a quantity of phase hold states in p(k) is greater than a sum of a quantity of phase early states in p(k) and a quantity of phase late states in p(k), or when a quantity of phase early states in p(k) is equal to a quantity of phase late states in p(k), the majority vote circuit 109 uses phase hold as the target clock phase information.

The digital loop filter circuit 110 is configured to: receive the target clock phase information sent by the majority vote circuit 109, perform low-pass filtering on the target clock phase information to obtain absolute clock phase information (namely, a clock phase), and output the absolute clock phase information to the phase interpolation circuit 111. The absolute clock phase information is specific phase information, for example, π/3 or π. It can be understood that the output clock phase information p(k) and the target clock phase information are both relative clock phase information such as phase early, phase hold, or phase late.

The phase interpolation circuit 111 is configured to: receive the absolute clock phase information sent by the digital loop filter circuit 110, perform a phase interpolation operation on the absolute clock phase information to generate a clock signal, and output the clock signal to the analog-to-digital conversion circuit 102. The clock signal is used to control the analog-to-digital conversion circuit 102 to perform sampling on a received linear equalized signal to obtain a sampled signal.

In this embodiment of this application, the adaptive circuit 108 is further configured to: determine a tap coefficient c_ffe of the feedforward equalization circuit 103 based on the signal error information e(k), and send the tap coefficient c_ffe to the feedforward equalization circuit 103.

The feedforward equalization circuit 103 is further configured to: receive the tap coefficient c_ffe sent by the adaptive circuit 108, and adjust a quantity of taps of the feedforward equalization circuit 103 based on the tap coefficient c_ffe.

In this embodiment of this application, the phase detection circuit 107 is further configured to output the decision result s(k) to the decoding circuit 106.

In an implementation of this application, the decoding circuit 106 is further configured to: receive the decision result s(k) sent by the phase detection circuit 107, and decode the first transmission sequence based on the decision result s(k), to obtain the first decoded signal for recovering the sampled signal.

In another implementation of this application, the decoding circuit 106 is further configured to: receive the decision result s(k) sent by the phase detection circuit 107, and decode the second transmission sequence based on the decision result s(k), to obtain the second decoded signal for recovering the sampled signal.

Figure 2:
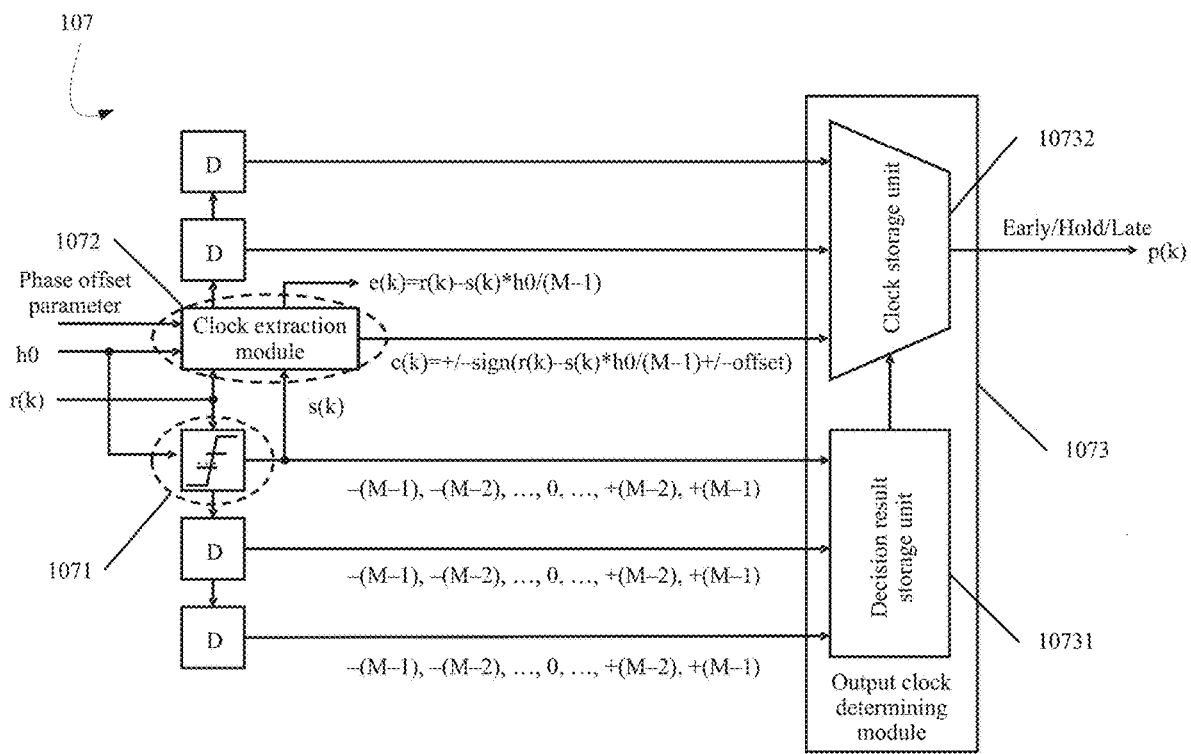
FIG. 2 is a schematic diagram of an internal structure of a phase detection circuit 107 shown in FIG. 1 according to an embodiment of this application.

FIG. 2 is a schematic diagram of an internal structure of the phase detection circuit 107 shown in FIG. 1, according to an embodiment of this application. As shown in FIG. 2, the phase detection circuit 107 may include a decision module 1071, a clock extraction module 1072, and an output clock determining module 1073. The output clock determining module 1073 may include a decision result storage unit 10731 and a clock storage unit 10732.

With reference to FIG. 1 and FIG. 2, the decision module 1071 is configured to: receive the forward equalized signal r(k) sent by the feedforward equalization circuit 103, decide a (2M−1) level of the forward equalized signal r(k) to obtain the decision result s(k), and output the decision result s(k) to the clock extraction module 1072.

The clock extraction module 1072 is configured to receive the forward equalized signal r(k) sent by the feedforward equalization circuit 103.

The clock extraction module 1072 is further configured to obtain the response amplitude parameter h0 of the transmission channel.

The clock extraction module 1072 is further configured to obtain the phase offset parameter offset.

The clock extraction module 1072 is further configured to receive the decision result s(k) sent by the decision module 1071.

The clock extraction module 1072 is further configured to extract the clock phase information c(k) in the forward equalized signal r(k) based on the forward equalized signal r(k), the decision result s(k), the response amplitude parameter h0, and the phase offset parameter offset.

The output clock determining module 1073 is configured to: determine the output clock phase information p(k) based on the at least three decision results and the at least three pieces of clock phase information in the at least three symbol periods, and output the output clock phase information p(k) to the majority vote circuit 109.

The decision result storage unit 10731 is configured to: store the at least three decision results in the at least three symbol periods, and send the at least three decision results to the clock storage unit 10732.

The clock storage unit 10732 is configured to store the at least three pieces of clock phase information in the at least three symbol periods.

The clock storage unit 10732 is further configured to: receive the at least three decision results sent by the decision result storage unit 10731, and determine the output clock phase information p(k) based on the at least three decision results and the at least three pieces of clock phase information, and output the output clock phase information p(k) to the majority vote circuit 109.

As shown in FIG. 2, in this embodiment of this application, when receiving the forward equalized signal r(k), the phase detection circuit 107 determines, in a current symbol period, a decision result s(k) and clock phase information c(k) corresponding to the forward equalized signal r(k), and then buffers the decision result s(k) and the clock phase information c(k) with delay. Certainly, in another embodiment, when receiving the forward equalized signal r(k), the phase detection circuit 107 may alternatively buffer the forward equalized signal r(k) with delay, and then determine, in a clock period in which output clock phase information p(k) needs to be determined, a decision result s(k) and clock phase information c(k) corresponding to the forward equalized signal r(k).

It can be understood that the phase detection circuit 107 shown in FIG. 2 is merely an optional implementation of the phase detection circuit provided in this application. Certainly, in another embodiment, the phase detection circuit 107 may alternatively have another internal structure.

It can be further understood that the clock recovery apparatus 100 shown in FIG. 1 is merely an optional implementation of the clock recovery apparatus provided in this application. Certainly, in another embodiment, the clock recovery apparatus 100 may include a circuit that is not shown in FIG. 1, or the clock recovery apparatus 100 may not include one or more circuits shown in FIG. 1.

Figure 3:
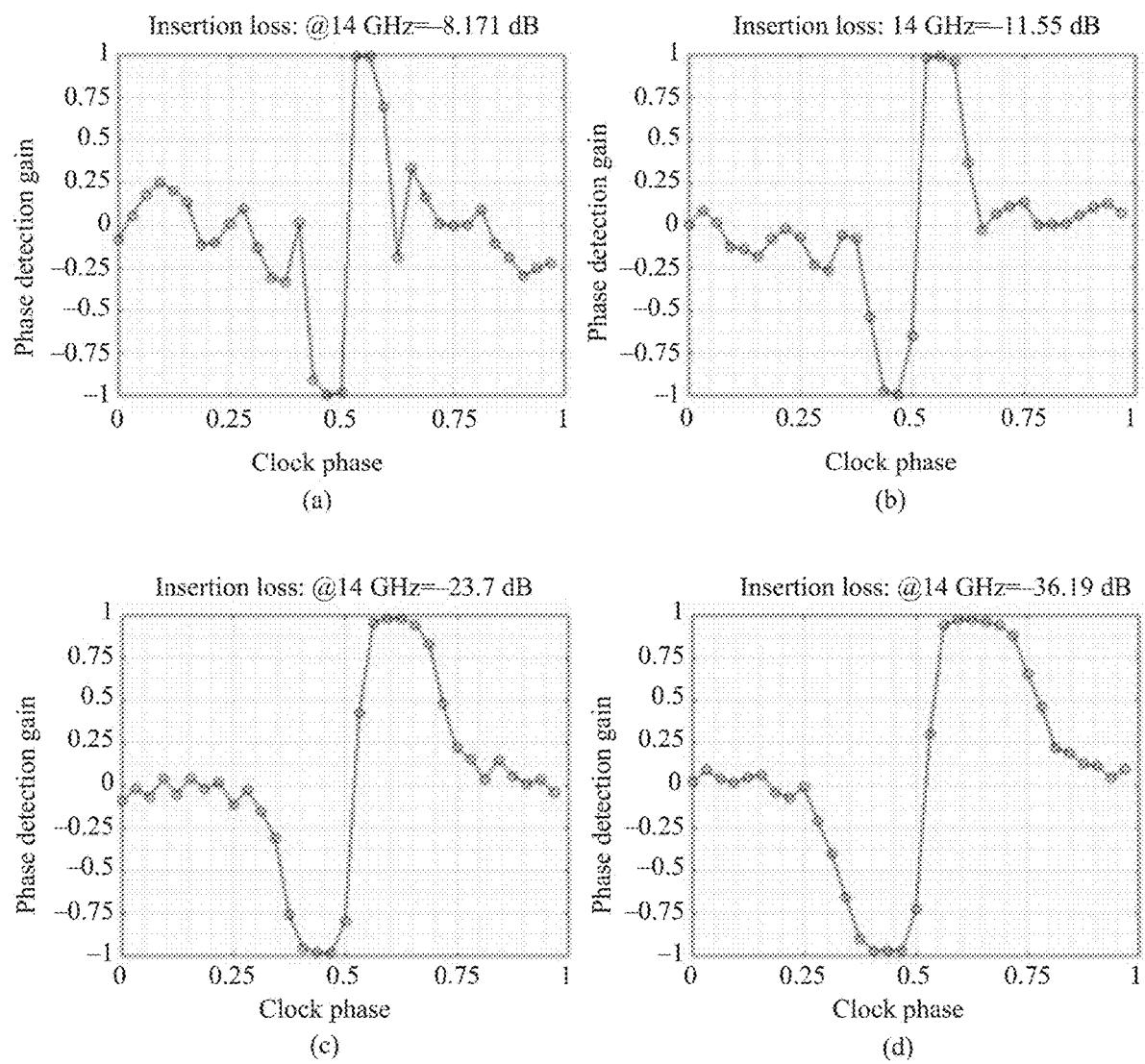
FIG. 3 is a simulated curve chart of a PAM-4 signal-based phase detection gain of the clock recovery apparatus 100 shown in FIG. 1 according to an embodiment of this application.

FIG. 3 is a simulated curve chart of a PAM-4 signal-based phase detection gain of the clock recovery apparatus 100 shown in FIG. 1, according to an embodiment of this application. Specifically, when the input signal is a PAM-4 signal, a SerDes rate is 14 GHz, and the clock phase is tuned to a pulse response edge, simulated curve charts of phase detection gains of the phase detection circuit 107 are respectively shown in (a), (b), (c), and (d) in FIG. 3 when insertion losses (Insertion Loss, IL) of the link are −8.171 dB, −11.55 dB, −23.7 dB, and −36.19 dB respectively.

Figure 4:
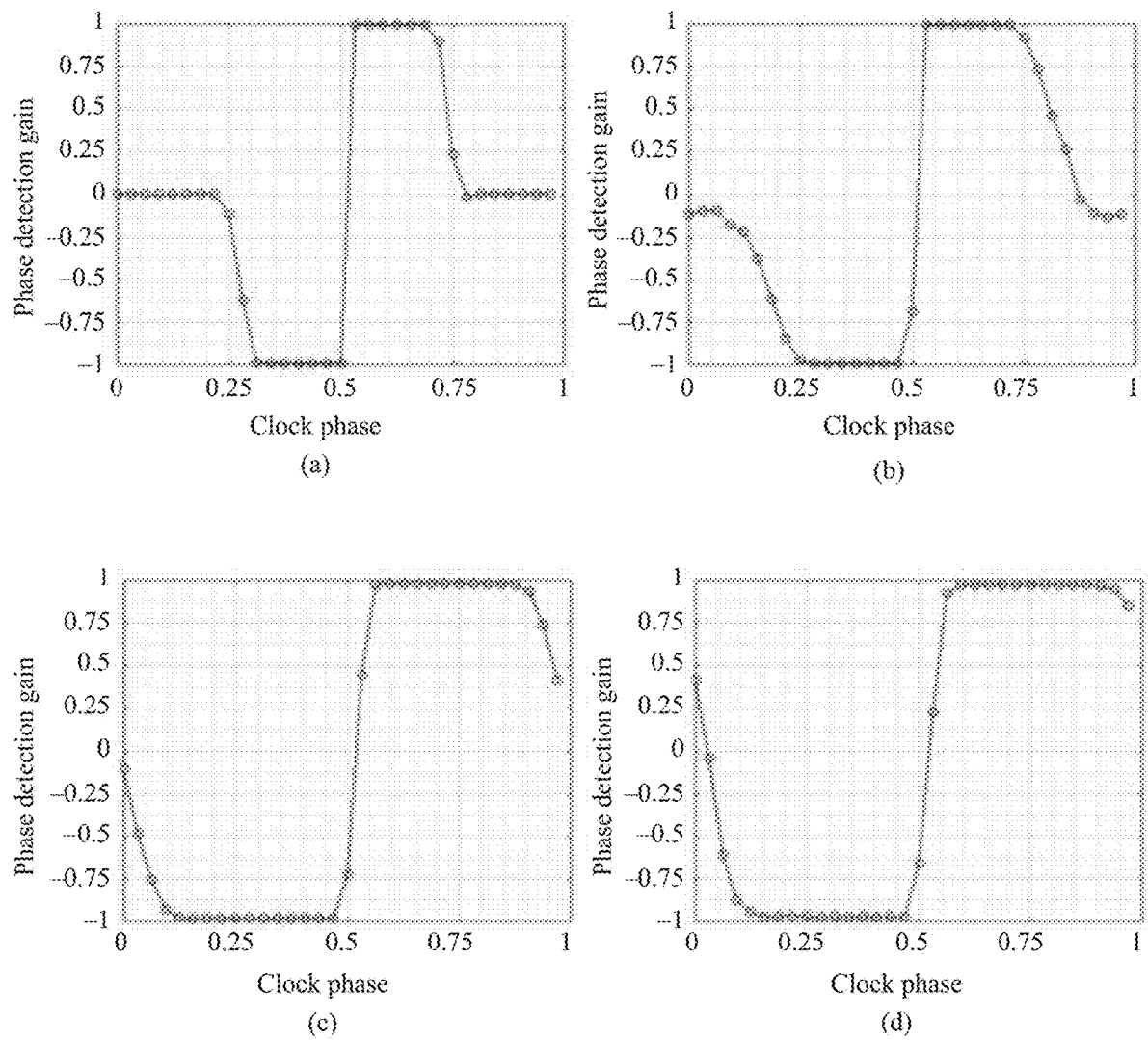
FIG. 4 is a simulated curve chart of a PAM-2 signal-based phase detection gain of the clock recovery apparatus 100 shown in FIG. 1 according to an embodiment of this application.

Further, FIG. 4 is a simulated curve chart of a PAM-2 signal (or NRZ code)-based phase detection gain of the clock recovery apparatus 100 shown in FIG. 1, according to an embodiment of this application. Specifically, when the input signal is a PAM-2 signal (or NRZ code), a SerDes rate is 14 GHz, and the clock phase is tuned to a pulse response edge, simulated curve charts of phase detection gains of the phase detection circuit 107 are respectively shown in (a), (b), (c), and (d) in FIG. 4 when ILs are −8.171 dB, −11.55 dB, −23.7 dB, and −36.19 dB respectively.

It can be learned from FIG. 3 or FIG. 4 that a phase detection gain curve of the phase detection circuit 107 approximates a gain curve in an ideal condition regardless of how an IL changes, that is, regardless of a configuration of a circuit (for example, the feedforward equalization circuit 103 and the equalization circuit 104) other than the phase detection circuit 107 in the clock recovery apparatus 100. It can be learned that the phase detection gain of the phase detection circuit 107 is insensitive to the configuration of the equalization circuit 104. Therefore, a CDR path that includes the analog-to-digital conversion circuit 102, the feedforward equalization circuit 103, the phase detection circuit 107, the majority vote circuit 109, the digital loop filter circuit 110, and the phase interpolation circuit 111 can share an equalization capability with the equalization circuit 104. In this way, the clock recovery apparatus 100 can implement joint convergence of CDR and equalization, so that the clock recovery apparatus 100 can lock the (1+D) channel.

It can be learned from FIG. 3 and FIG. 4 that the phase detection gain curve of the phase detection circuit 107 approximates the gain curve in the ideal condition regardless of a type of an input signal received by the clock recovery apparatus 100, that is, regardless of a type of an input signal of the phase detection circuit 107. It can be learned that for any input signal, the phase detection circuit 107 can still achieve a stable phase detection gain when the clock phase is tuned to the pulse response edge, so that the clock recovery apparatus 100 can automatically lock the pulse response edge stably.

In this embodiment of this application, the phase detection circuit extracts the clock phase information based on the forward equalized signal, the decision result, the response amplitude parameter of the transmission channel, and the phase offset parameter: and determines the output clock phase information based on the at least three decision results and the at least three pieces of clock phase information in the at least three symbol periods. In this way, a stable phase detection gain can be achieved when the clock phase is tuned to the pulse response edge, so that the clock recovery apparatus including the phase detection circuit can automatically lock the pulse response edge stably at a receive end. In addition, the phase detection gain of the phase detection circuit is insensitive to the configuration of the equalization circuit. Therefore, the CDR path that includes the analog-to-digital conversion circuit, the feedforward equalization circuit, the phase detection circuit, the majority vote circuit, the digital loop filter circuit, and the phase interpolation circuit can share the equalization capability with the equalization circuit. In this way, the clock recovery apparatus can implement joint convergence of CDR and equalization, so that the clock recovery apparatus can lock the (1+D) channel. In addition, the clock recovery apparatus performs sequence detection by using the maximum likelihood sequence estimation algorithm, to resist process, voltage, and temperature fluctuation (PVT fluctuation), thereby improving overall bit error performance. Moreover, the clock recovery apparatus is implemented at relatively low costs.

Figure 5:
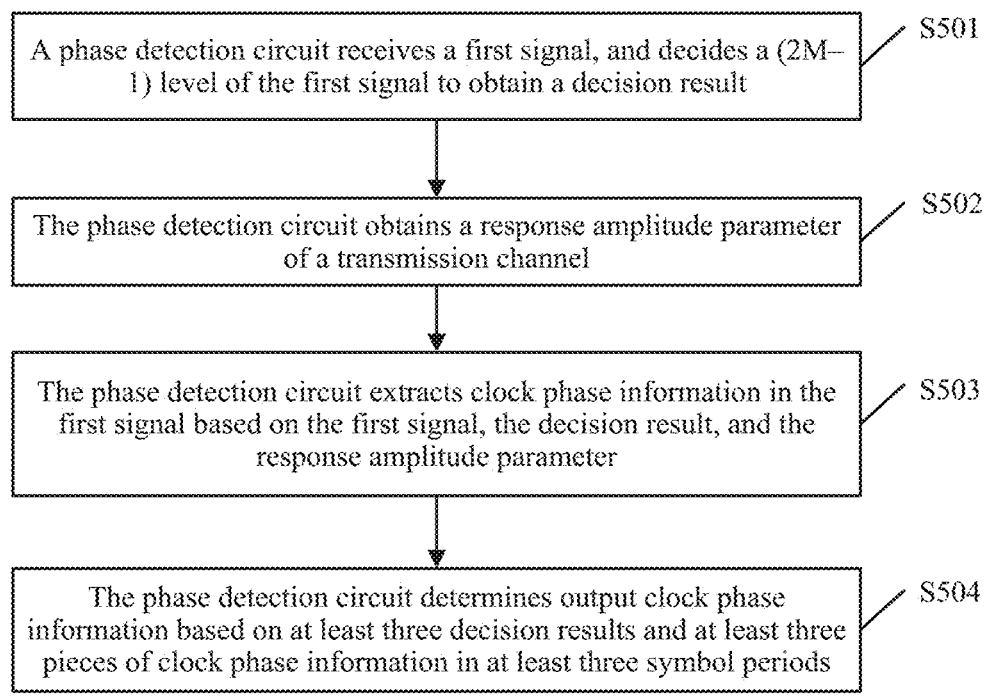
FIG. 5 is a schematic flowchart of a phase detection method according to an embodiment of this application.

FIG. 5 is a schematic flowchart of a phase detection method according to an embodiment of this application. The phase detection method may be specifically applied to the phase detection circuit 107 shown in FIG. 2. As shown in FIG. 5, the phase detection method includes the following steps.

S501. A phase detection circuit receives a first signal, and decides a (2M−1) level of the first signal to obtain a decision result.

In this embodiment of this application, the first signal is a (2M−)-level signal, where M is a positive integer.

In an implementation of this application, the first signal is a signal obtained by performing baud rate sampling on a PAM-(2M−1) signal. The PAM-(2M−1) signal is a signal obtained through (2M−1)-ary PAM modulation. Certainly, in another implementation, the first signal may alternatively be a signal obtained by performing baud rate sampling on a (2M−1)-level signal that is in another form, and the first signal may alternatively be a signal obtained by performing sampling on the PAM-(2M−1) signal in another manner. A manner of obtaining the first signal is not specifically limited in this embodiment of this application.

In this embodiment of this application, the decision result is an element in a preset decision set, and the preset decision set is (−(M−1), −(M−2), . . . , 0, . . . , +(M−2), +(M−1)).

For example, when M is 2, the preset decision set is {−1, 0, +1}. To be specific, in any decision, the decision result is one of −1, 0, and +1.

S502. The phase detection circuit obtains a response amplitude parameter of a transmission channel.

It should be noted that in this embodiment of this application, a manner in which the phase detection circuit obtains the response amplitude parameter is not specifically limited. For example, the phase detection circuit may obtain a preconfigured response amplitude parameter from the phase detection circuit. For another example, the phase detection circuit may obtain a response amplitude parameter that is generated by an external circuit and that is sent to the phase detection circuit.

In this embodiment of this application, the transmission channel is a link through which a transmitted signal passes when the transmitted signal is transmitted from a transmitter to the phase detection circuit. The link may be an electrical link, an optical link, or a wireless link. It should be noted that the phase detection method according to this embodiment of this application may be specifically applied to a scenario that requires high-speed interconnection. In other words, the link may be an inter-chip, inter-board, or inter-system high-speed interconnection link; or the link may be an interconnection link between a chip and an optical module or even an optical link between optical modules.

S503. The phase detection circuit extracts clock phase information in the first signal based on the first signal, the decision result, and the response amplitude parameter.

For ease of description, in this embodiment of this application, the first signal, the decision result, the response amplitude parameter, and the clock phase information are respectively represented by using $r(k)$, $s(k)$, $h0$, and $c(k)$.

In an implementation of this application, the phase detection circuit may calculate the clock phase information $c(k)$ according to the following formula: $c(k)=+/-\mathrm{sign}(r(k)-s(k)*h0/(M-1))$, where $\mathrm{sign}(r(k)-s(k)*h0/(M-1))$ represents a sign determining operation on $r(k)-s(k)*h0/(M-1)$. It should be noted that whether a result of the sign determining operation is positive or negative specifically depends on an actual situation. Certainly, in another implementation, the clock phase information $c(k)$ may be alternatively extracted in another manner based on the first signal $r(k)$, the decision result $s(k)$, and the response amplitude parameter $h0$.

In this embodiment of this application, values +1, 0, and −1 of the clock phase information $c(k)$ respectively represent early, hold, and late states of the clock phase information $c(k)$.

S504. The phase detection circuit determines output clock phase information based on at least three decision results and at least three pieces of clock phase information in at least three symbol periods.

For ease of description, in this embodiment of this application, the output clock phase information is represented by using $p(k)$.

In this embodiment of this application, the determining output clock phase information based on at least three decision results and at least three pieces of clock phase information in at least three symbol periods specifically includes: using the decision result as address information, and extracting the output clock phase information $p(k)$ from the at least three pieces of clock phase information in the at least three symbol periods or a combination of the at least three pieces of clock phase information based on the at least three decision results in the at least three symbol periods.

In this embodiment of this application, the at least three symbol periods may be at least three adjacent symbol periods or at least three nonadjacent symbol periods. The at least three adjacent symbol periods are at least three symbol periods continuous in time, and the at least three nonadjacent symbol periods are at least three symbol periods discontinuous in time.

In an implementation of this application, the output clock phase information $p(k)$ is determined based on three decision results and three pieces of clock phase information in three adjacent symbol periods.

In this implementation, if the first signal $r(k)$ is a 3-level signal, and three decision results $s(z-1)$, $s(z)$, and $s(z+1)$ in three adjacent symbol periods are respectively +1, 0, and −1, the output clock phase information $p(k)$ may be corresponding clock phase information $c(z)$ when the decision result is 0, that is, $p(k)=c(z)=-\mathrm{sign}(r(z))$.

In this embodiment of this application, the clock phase information in the first signal is extracted based on the first signal, the decision result, and the response amplitude parameter of the transmission channel; and the output clock phase information is determined based on the at least three decision results and the at least three pieces of clock phase information in the at least three symbol periods. According to the phase detection method in this embodiment of this application, a stable phase detection gain can be achieved when a clock phase is tuned to a pulse response edge.

Figure 6:
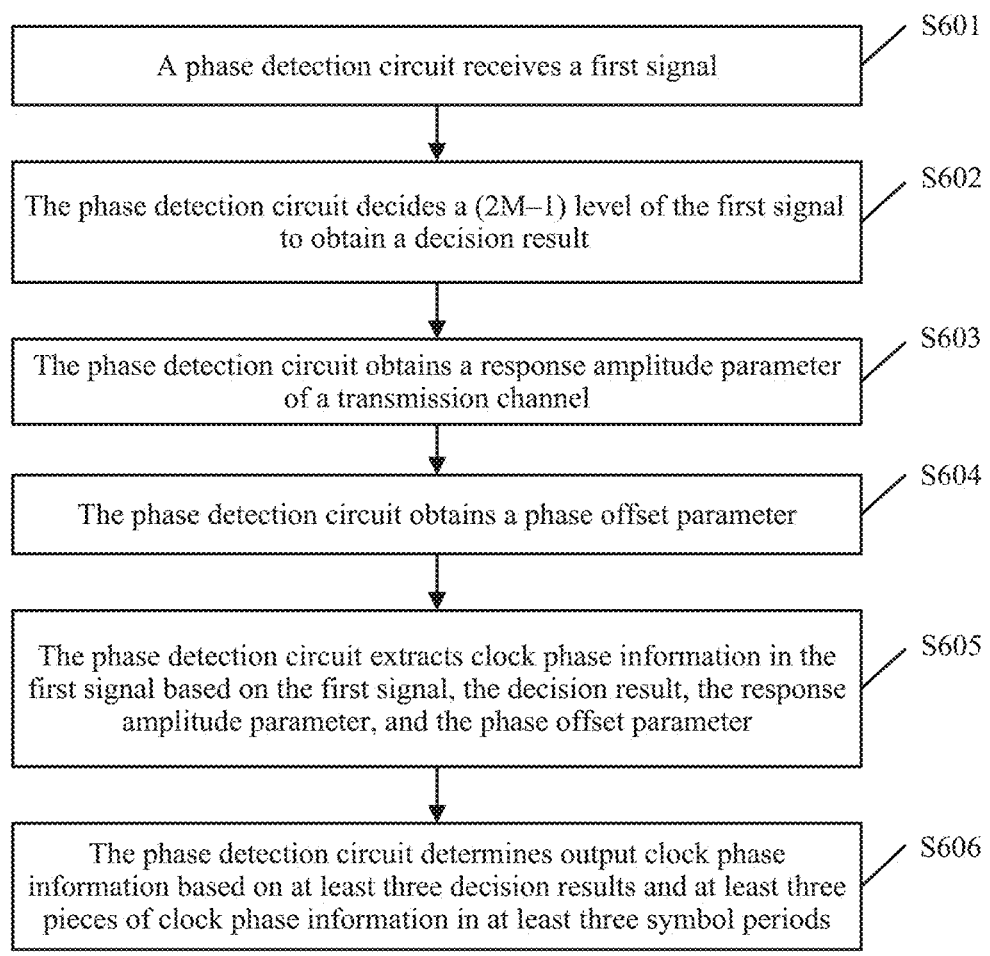
FIG. 6 is a schematic flowchart of another phase detection method according to an embodiment of this application.

FIG. 6 is a schematic flowchart of another phase detection method according to an embodiment of this application. The phase detection method may be specifically applied to the phase detection circuit 107 shown in FIG. 2. As shown in FIG. 6, the phase detection method includes the following steps.

S601. A phase detection circuit receives a first signal.

In this embodiment of this application, the first signal is a (2M−)-level signal, where M is a positive integer.

In this embodiment of this application, the first signal may be a signal obtained by performing forward equalization on a second signal. The second signal is an M-level signal. Specifically, the first signal may be a signal obtained by an FFE by performing forward equalization on the second signal and sent to the phase detection circuit.

It should be noted that the FFE can implement a (+D) filtering effect on any response channel. In other words, the FFE can filter any response channel into a (1+D) channel. ISI of a post 1 tap is retained in the (1+D) channel, and an amplitude of the (1+D) channel is the same as an amplitude of a transmitted signal. In the (1+D) channel, an M-level signal is converted into a (2M−1)-level signal.

In this embodiment of this application, the second signal may be a signal obtained by performing sampling on a third signal. In an implementation of this application, the third signal is a modulated signal obtained through M-ary modulation. In another implementation of this application, the third signal is a signal obtained by performing continuous time linear equalization on a fourth signal, and the fourth signal is a modulated signal obtained through M-ary modulation.

In an implementation of this application, the third signal may be a PAM-M signal obtained through M-ary PAM modulation, and the second signal is a signal obtained by performing baud rate sampling on the third signal. Certainly, in another implementation, the third signal may alternatively be a modulated signal obtained through M-ary modulation in another manner, and the second signal may alternatively be a signal obtained by performing sampling on the third signal in another manner. Manners of obtaining the second signal and the third signal are not specifically limited in this embodiment of this application.

S602. The phase detection circuit decides a (2M−1) level of the first signal to obtain a decision result.

In this embodiment of this application, the decision result is an element in a preset decision set, and the preset decision set is {−(M−1), −(M−2), . . . , 0, . . . , +(M−2), +(M−1)}.

For example, when M is 4, the preset decision set is {−3, −2, −1, 0, +1, +2, +3}. To be specific, in any decision, the decision result is one of −3, −2, −1, 0, +1, +2, and +3.

S603. The phase detection circuit obtains a response amplitude parameter of a transmission channel.

In this embodiment of this application, the transmission channel is a link through which a transmitted signal passes when the transmitted signal is transmitted from a signal transmit end to the phase detection circuit. It can be learned from the foregoing descriptions that the transmission channel is the (1+D) channel.

In an implementation of this application, the obtaining a response amplitude parameter of a transmission channel may specifically include: obtaining a preconfigured response amplitude parameter of the transmission channel from the phase detection circuit. In this case, the response amplitude parameter is preconfigured in the phase detection circuit. Therefore, the phase detection circuit may directly obtain the response amplitude parameter from the phase detection circuit as required.

In another implementation of this application, the obtaining a response amplitude parameter of a transmission channel may specifically include: determining signal error information based on the first signal, the decision result, and a historical response amplitude parameter, and outputting the signal error information; and obtaining a response amplitude parameter that is of the transmission channel and that is determined based on the signal error information.

In this implementation, in a first symbol period, the historical response amplitude parameter may be an initial response amplitude parameter preconfigured in the phase detection circuit; and in an $N^{th}$ symbol period, the historical response amplitude parameter may be a response amplitude parameter obtained at a historical moment (for example, in an $(N-1)^{th}$ symbol period), where N is a positive integer greater than 1.

In this case, the phase detection circuit outputs the signal error information to an adaptive circuit, so that the adaptive circuit determines a response amplitude parameter based on the signal error information and sends the determined response amplitude parameter to the phase detection circuit. Therefore, the phase detection circuit can obtain the response amplitude parameter sent by the adaptive circuit. The adaptive circuit may determine the response amplitude parameter by using an adaptive algorithm such as an LMS algorithm.

Certainly, in another implementation, the response amplitude parameter may be alternatively obtained in another manner. In this embodiment of this application, a manner of obtaining the response amplitude parameter is not specifically limited.

When a manner of obtaining the response amplitude parameter of the transmission channel is specifically obtaining a preconfigured response amplitude parameter of the transmission channel from the phase detection circuit, step S602 of deciding a (2M−1) level of the first signal to obtain a decision result may specifically include: determining a decision threshold based on the response amplitude parameter, and deciding the (2M−1) level of the first signal based on the decision threshold, to obtain the decision result.

For ease of description, in this embodiment of this application, the response amplitude parameter is represented by using h0.

The decision threshold may include −(2M−3)/(2(M−1))*h0, −(2M−5)/(2(M−1))*h0, . . . , +(2M−5)/(2(M−1))*h0, and +(2M−3)/(2(M−1))*h0.

When a manner of obtaining the response amplitude parameter of the transmission channel is specifically determining signal error information based on the first signal, the decision result, and a historical response amplitude parameter, and outputting the signal error information; and obtaining a response amplitude parameter that is of the transmission channel and that is determined based on the signal error information, step S602 of deciding a (2M−1) level of the first signal to obtain a decision result may specifically include: determining a decision threshold based on the historical response amplitude parameter, and deciding the (2M−1) level of the first signal based on the decision threshold, to obtain the decision result.

S604. The phase detection circuit obtains a phase offset parameter.

In this embodiment of this application, the phase offset parameter is used to tune clock phase information.

In an implementation of this application, the obtaining a phase offset parameter may specifically include: obtaining a preconfigured phase offset parameter from the phase detection circuit. In this case, the phase offset parameter is preconfigured in the phase detection circuit. Therefore, the phase detection circuit may directly obtain the phase offset parameter from the phase detection circuit as required.

In another implementation of this application, the obtaining a phase offset parameter may specifically include: obtaining a phase offset parameter that is determined based on at least three historical phase offset parameters and transmission performance information corresponding to each historical phase offset parameter. In this embodiment of this application, the historical phase offset parameter is a phase offset parameter obtained at a historical moment. The at least three historical phase offset parameters may be at least three historical response amplitude parameters adjacent in value. In this case, the phase offset parameter may be determined by a calibration circuit based on the at least three historical phase offset parameters and the transmission performance information corresponding to each historical phase offset parameter and sent to the phase detection circuit.

Specifically, that the calibration circuit determines the phase offset parameter based on the at least three historical phase offset parameters and the transmission performance information corresponding to each historical phase offset parameter may specifically include: obtaining the at least three historical phase offset parameters and the transmission performance information corresponding to each historical phase offset parameter, comparing the obtained transmission performance information, and determining a historical phase offset parameter corresponding to optimal transmission performance information as the phase offset parameter. The transmission performance parameter includes but is not limited to a signal-to-noise ratio SNR or a BER. When the transmission performance information is an SNR the optimal transmission performance information is a highest SNR; or when the transmission performance information is a BER the optimal transmission performance information is a lowest BER.

In an implementation of this application, a manner in which the calibration circuit obtains the transmission performance information may be as follows: after the first signal passes through an equalization circuit, the equalization circuit determines the transmission performance information and sends the transmission performance information to the calibration circuit. In this implementation, the equalization circuit is configured to: perform equalization on the first signal to obtain a first equalized signal, perform sequence detection on the first equalized signal to identify a first transmission sequence, and calculate transmission performance information of the first transmission sequence.

In another implementation of this application, a manner in which the calibration circuit obtains the transmission performance information may be as follows: after the first signal passes through an equalization circuit and a decoding circuit in sequence, the decoding circuit determines the transmission performance information and sends the transmission performance information to the calibration circuit. In this implementation, the equalization circuit is configured to: perform equalization on the first signal to obtain a first equalized signal, and perform sequence detection on the first equalized signal to identify a first transmission sequence; and the decoding circuit is configured to: decode the first transmission sequence to obtain first decoded information, and calculate transmission performance information of the first transmission sequence.

In still another implementation of this application, a manner in which the calibration circuit obtains the transmission performance information may be as follows: after the second signal passes through an equalization circuit, the equalization circuit determines the transmission performance information and sends the transmission performance information to the calibration circuit. In this implementation, the equalization circuit is configured to: perform equalization on the second signal to obtain a second equalized signal, perform sequence detection on the second equalized signal to identify a second transmission sequence, and calculate transmission performance information of the second transmission sequence.

In yet another implementation of this application, a manner in which the calibration circuit obtains the transmission performance information may be as follows: after the second signal passes through an equalization circuit and a decoding circuit in sequence, the decoding circuit determines the transmission performance information and sends the transmission performance information to the calibration circuit. In this implementation, the equalization circuit is configured to: perform equalization on the second signal to obtain a second equalized signal, and perform sequence detection on the second equalized signal to identify a second transmission sequence: and the decoding circuit is configured to: decode the second transmission sequence to obtain second decoded information, and calculate transmission performance information of the second transmission sequence.

S605. The phase detection circuit extracts clock phase information in the first signal based on the first signal, the decision result, the response amplitude parameter, and the phase offset parameter.

For ease of description, in this embodiment of this application, the first signal, the decision result, the phase offset parameter, and the clock phase information are respectively represented by using $r(k)$, $s(k)$, offset, and $c(k)$.

In an implementation of this application, the clock phase information $c(k)$ may be calculated according to the following formula: $c(k)=+/-\text{sign}(r(k)-s(k)*h0/(M-1)+/-\text{offset})$, where $\text{sign}(r(k)-s(k)*h0(M-1))$ represents a sign determining operation on $r(k)-s(k)*h0(M-1)$. It should be noted that whether a result of the sign determining operation and the phase offset parameter offset are positive or negative specifically depends on an actual situation. Certainly, in another implementation, the clock phase information $c(k)$ may be alternatively extracted in another manner based on the first signal $r(k)$, the decision result $s(k)$, the response amplitude parameter $h0$, and the phase offset parameter offset.

In this embodiment of this application, values +1, 0, and −1 of the clock phase information $c(k)$ respectively represent early, hold, and late states of the clock phase information $c(k)$. It can be understood that the clock phase information $c(k)$ is relative phase information.

S606. The phase detection circuit determines output clock phase information based on at least three decision results and at least three pieces of clock phase information in at least three symbol periods.

For ease of description, in this embodiment of this application, the output clock phase information is represented by using $p(k)$.

In this embodiment of this application, the determining output clock phase information based on at least three decision results and at least three pieces of clock phase information in at least three symbol periods specifically includes: using the decision result as address information, and extracting the output clock phase information $p(k)$ from the at least three pieces of clock phase information in the at least three symbol periods or a combination of the at least three pieces of clock phase information based on the at least three decision results in the at least three symbol periods.

In an implementation of this application, the output clock phase information $p(k)$ is processed to generate a clock signal. The clock signal is used to control sampling on the third signal to obtain the second signal.

In this embodiment of this application, that the output clock phase information $p(k)$ is processed to generate a clock signal may specifically include the following: First processing is performed on a plurality of pieces of output clock phase information $p(k)$ to obtain target clock phase information, second processing is performed on the target clock phase information to obtain absolute clock phase information, and third processing is performed on the absolute clock phase information to generate the clock signal. The first processing, the second processing, and the third processing may be respectively a majority vote, low-pass filtering, and a phase interpolation operation. Certainly, in another embodiment, other processing may be alternatively performed on the output clock phase information $p(k)$ to generate the clock signal.

The absolute clock phase information is specific phase information, for example, $\pi/3$ or $\pi$. It can be understood that the output clock phase information $p(k)$ and the target clock phase information are both relative clock phase information. The relative clock phase information may include phase early, phase hold, and phase late.

Certainly, in another embodiment, other processing may be alternatively performed on the output clock phase information p(k) to generate the clock signal. For example, other processing may be performed on a plurality of pieces of output clock phase information p(k) to obtain target clock phase information, and other processing may be alternatively performed on the absolute clock phase information to generate the clock signal.

In this embodiment of this application, the clock phase information in the first signal is extracted based on the first signal, the decision result, and the response amplitude parameter of the transmission channel; and the output clock phase information is determined based on the at least three decision results and the at least three pieces of clock phase information in the at least three symbol periods. According to the phase detection method in this embodiment of this application, a stable phase detection gain can be achieved when a clock phase is tuned to a pulse response edge.

Figure 7:
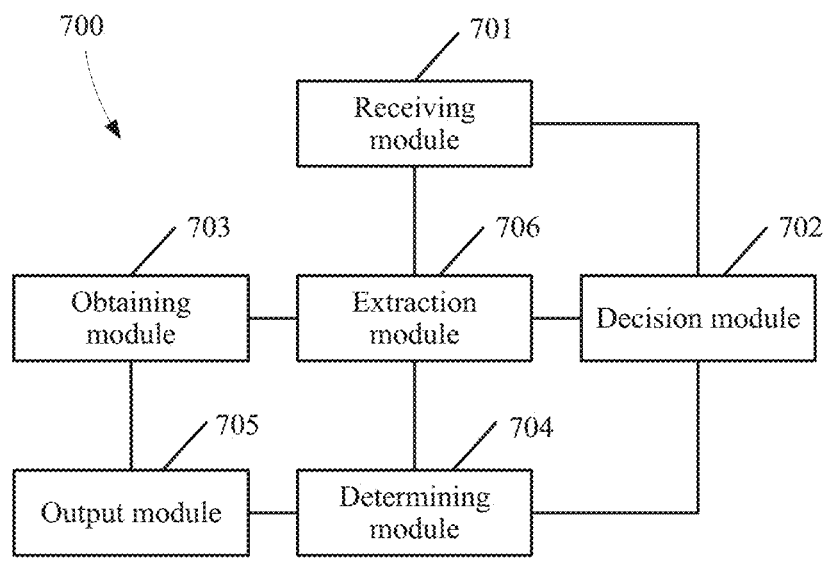
FIG. 7 is a schematic block diagram of a phase detection circuit 700 according to an embodiment of this application.

FIG. 7 is a schematic block diagram of a phase detection circuit 700 according to an embodiment of this application. As shown in FIG. 7, the phase detection circuit 700 may include a receiving module 701, a decision module 702, an obtaining module 703, a determining module 704, an output module 705, and an extraction module 706.

The receiving module 701 is configured to receive a first signal. In this embodiment of this application, the first signal is a (2M−1)-level signal, where M is a positive integer.

In an optional implementation, the first signal is a signal obtained by performing forward equalization on a second signal, and the second signal is an M-level signal.

In an optional implementation, the second signal is a signal obtained by performing sampling on a third signal, and the third signal is a modulated signal obtained through M-ary modulation.

The decision module 702 is configured to decide a (2M−1) level of the first signal to obtain a decision result. The obtaining module 703 is configured to obtain a response amplitude parameter of a transmission channel.

In an implementation of this application, the obtaining module 703 is specifically configured to obtain a preconfigured response amplitude parameter of the transmission channel from the phase detection circuit 700.

The determining module 704 is configured to determine signal error information based on the first signal, the decision result, and a historical response amplitude parameter.

The output module 705 is configured to output the signal error information.

In another implementation of this application, the obtaining module 703 is further specifically configured to obtain a response amplitude parameter that is of the transmission channel and that is determined based on the signal error information.

The determining module 704 is further configured to determine a decision threshold based on the response amplitude parameter.

The decision module 702 is specifically configured to decide the (2M−1) level of the first signal based on the decision threshold to obtain the decision result, where the decision result is an element in a preset decision set, and the preset decision set is {−(M−1), −(M−2), . . . , 0, . . . , +(M−2), +(M−1)}.

The extraction module 706 is configured to extract clock phase information in the first signal based on the first signal, the decision result, and the response amplitude parameter. The obtaining module 703 is further configured to obtain a phase offset parameter, where the phase offset parameter is used to tune the clock phase information.

In an implementation of this application, the obtaining module 703 is specifically configured to obtain a preconfigured phase offset parameter from the phase detection circuit 700.

In another implementation of this application, the obtaining module 703 is further specifically configured to obtain a phase offset parameter that is determined based on at least three historical phase offset parameters and transmission performance information corresponding to each historical phase offset parameter, where the transmission performance information includes a signal-to-noise ratio or a bit error rate.

The extraction module 706 is specifically configured to extract the clock phase information in the first signal based on the first signal, the decision result, the response amplitude parameter, and the phase offset parameter. The determining module 704 is further configured to determine output clock phase information based on at least three decision results and at least three pieces of clock phase information in at least three symbol periods.

In an optional implementation, the output clock phase information is processed to generate a clock signal, and the clock signal is used to control sampling on the third signal to obtain the second signal.

It should be noted that the phase detection circuit 700 may be specifically applied to any receiver that needs to perform phase detection on a received signal. For example, the phase detection circuit 700 may be specifically applied to the clock recovery apparatus 100 shown in FIG. 1.

Based on the same inventive concept, a problem-resolving principle and beneficial effects of the phase detection circuit 700 provided in this embodiment of this application are similar to those in the method embodiments of this application. Therefore, for an implementation of the phase detection circuit 700, refer to the implementations of the phase detection method shown in FIG. 5 or FIG. 6. Repeated content is not described herein again.

Figure 8:
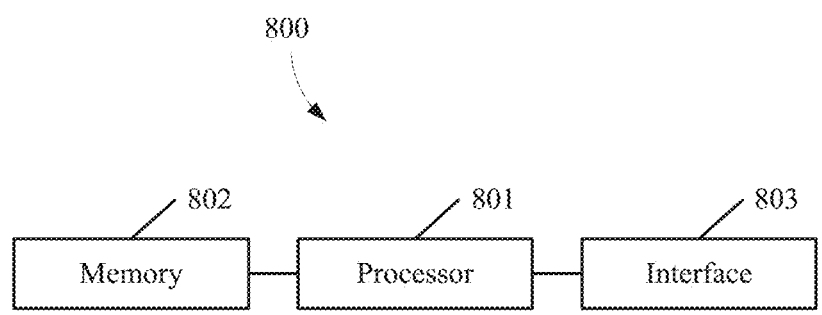
FIG. 8 is a schematic block diagram of a phase detection circuit 800 according to an embodiment of this application.

FIG. 8 is a schematic block diagram of a phase detection circuit 800 according to an embodiment of this application. As shown in FIG. 8, the phase detection circuit 800 may include a processor 801, a memory 802, and one or more interfaces 803. The memory 802 is configured to store one or more computer programs, and the computer program includes a program instruction.

Specifically, the processor 801 is configured to invoke the program instruction to perform the following operations:

receiving a first signal, and deciding a (2M−1) level of the first signal to obtain a decision result, where the first signal is a (2M−1)-level signal, and M is a positive integer;

obtaining a response amplitude parameter of a transmission channel;

extracting clock phase information in the first signal based on the first signal, the decision result, and the response amplitude parameter; and determining output clock phase information based on at least three decision results and at least three pieces of clock phase information that are corresponding to the first signal and that are in at least three symbol periods.

In an implementation of this application, when the processor 801 is configured to invoke the program instruction to perform the operation of obtaining a response amplitude parameter of a transmission channel, the processor 801 specifically performs the following operation:

obtaining a preconfigured response amplitude parameter of the transmission channel from the phase detection circuit.

In another implementation of this application, when the processor 801 is configured to invoke the program instruction to perform the operation of obtaining a response amplitude parameter of a transmission channel, the processor 801 specifically performs the following operation:

determining signal error information based on the first signal, the decision result, and a historical response amplitude parameter, and outputting the signal error information; and obtaining a response amplitude parameter that is of the transmission channel and that is determined based on the signal error information.

In an optional implementation, when the processor 801 is configured to invoke the program instruction to perform the operation of extracting clock phase information in the first signal based on the first signal, the decision result, and the response amplitude parameter, the processor 801 specifically performs the following operation:

obtaining a phase offset parameter, where the phase offset parameter is used to tune the clock phase information; and extracting the clock phase information in the first signal based on the first signal, the decision result, the response amplitude parameter, and the phase offset parameter.

In an implementation of this application, when the processor 801 is configured to invoke the program instruction to perform the operation of obtaining a phase offset parameter, the processor 801 specifically performs the following operation:

obtaining a preconfigured phase offset parameter from the phase detection circuit.

In another implementation of this application, when the processor 801 is configured to invoke the program instruction to perform the operation of obtaining a phase offset parameter, the processor 801 specifically performs the following operation:

obtaining a phase offset parameter that is determined based on at least three historical phase offset parameters and transmission performance information corresponding to each historical phase offset parameter, where the transmission performance information includes a signal-to-noise ratio or a bit error rate.

In an optional implementation, when the processor 801 is configured to invoke the program instruction to perform the operation of deciding a (2M−1) level of the first signal to obtain a decision result, the processor 801 specifically performs the following operations:

determining a decision threshold based on the response amplitude parameter; and deciding the (2M−1) level of the first signal based on the decision threshold to obtain the decision result, where the decision result is an element in a preset decision set, and the preset decision set is {−(M−1), −(M−2), . . . , 0, . . . , +(M−2), +(M−1)}.

In an optional implementation, the first signal is a signal obtained by performing forward equalization on a second signal, and the second signal is an M-level signal.

In an optional implementation, the second signal is a signal obtained by performing sampling on a third signal, and the third signal is a modulated signal obtained through M-ary modulation.

In an optional implementation, the output clock phase information is processed to generate a clock signal, and the clock signal is used to control sampling on the third signal to obtain the second signal.

The processor 801 may be a central processing unit (CPU). The processor 801 may alternatively be a general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor.

The memory 802 may include a read-only memory (ROM), a random access memory (RAM), and a nonvolatile random access memory.

It should be noted that the phase detection circuit 800 may be specifically applied to any receiver that needs to perform phase detection on a received signal. For example, the phase detection circuit 800 may be specifically applied to the clock recovery apparatus 100 shown in FIG. 1.

The interface 803 is configured to transmit data, control information, management information, or the like between the phase detection circuit 800 and another circuit in the receiver, between the phase detection circuit 800 and another network device, and between the phase detection circuit 800 and use equipment. It can be understood that the interface 803 includes an input interface and/or an output interface.

Based on the same inventive concept, a problem-resolving principle and beneficial effects of the phase detection circuit 800 provided in this embodiment of this application are similar to those in the method embodiments of this application. Therefore, for an implementation of the phase detection circuit 800, refer to the implementations of the phase detection method shown in FIG. 5 or FIG. 6. Repeated content is not described herein again.

A person of ordinary skill in the art may understand that all or some of the processes of the methods in the embodiments may be implemented by a computer program instructing related hardware. The program may be stored in a computer readable storage medium. When executed, the program may include the processes of the foregoing method embodiments. The foregoing storage medium may be a magnetic disk, an optical disc, a ROM, or a RAM

What is claimed is:

1. A phase detection method, applied to a phase detection circuit, wherein the method comprises:

receiving, by the phase detection circuit, a first signal and deciding a (2M−1) level of the first signal to obtain a decision result, wherein the first signal is a (2M−1)-level signal, and M is a positive integer greater than 1;

obtaining a response amplitude parameter of a transmission channel;

obtaining a phase offset parameter, wherein the phase offset parameter is used to tune clock phase information in the first signal;

extracting the clock phase information in the first signal based on the first signal, the decision result, the response amplitude parameter, and the phase offset parameter; and determining output clock phase information based on at least three decision results and at least three pieces of clock phase information in at least three symbol periods, wherein the at least three pieces of clock phase information comprises the clock phase information in the first signal.

2. The method according to claim 1, wherein the deciding the (2M−1) level of the first signal to obtain the decision result comprises:

determining a decision threshold based on the response amplitude parameter; and deciding the (2M−1) level of the first signal based on the decision threshold to obtain the decision result, wherein the decision result is an element in a preset decision set, and wherein the preset decision set is {−(M−1), −(M−2), . . . , +(M−2), +(M−1)}.

3. The method according to claim 1, wherein the output clock phase information is processed to generate a clock signal, and wherein the clock signal is used to control sampling on a signal.

4. A phase detection circuit, wherein the circuit comprises:
   a receiver of the phase detection circuit, configured to receive a first signal, wherein the first signal is a (2M−1)-level signal, and M is a positive integer greater than 1;
   at least one processor; and
   a non-transitory computer-readable storage medium coupled to the at least one processor and storing programming instructions for execution by the at least one processor, wherein the programming instructions instruct the at least one processor to:
   decide a (2M−1) level of the first signal to obtain a decision result;
   obtain a response amplitude parameter of a transmission channel;
   obtaining a phase offset parameter, wherein the phase offset parameter is used to tune clock phase information in the first signal;
   extract the clock phase information in the first signal based on the first signal, the decision result, the response amplitude parameter, and the phase offset parameter; and
   determine output clock phase information based on at least three decision results and at least three pieces of clock phase information in at least three symbol periods, wherein the at least three pieces of clock phase information comprises the clock phase information in the first signal.

5. The circuit according to claim 4, wherein the programming instructions instruct the at least one processor to:
   determine a decision threshold based on the response amplitude parameter; and
   decide the (2M−1) level of the first signal based on the decision threshold to obtain the decision result, wherein the decision result is an element in a preset decision set, and wherein the preset decision set is $\{-(M-1), -(M-2), \ldots, +(M-2), +(M-1)\}$.

6. The circuit according to claim 4, wherein the first signal is a signal obtained by performing forward equalization on a second signal, and wherein the second signal is an M-level signal.

7. A non-transitory computer-readable storage medium storing program instructions, and wherein when the program instructions are executed by at least one processor, the program instructions instruct the at least one processor to: receive, by a phase detection circuit, a first signal and decide a (2M 1) level of the first signal to obtain a decision result, wherein the first signal is a (2M 1) level signal, and M is a positive integer greater than 1; obtain a response amplitude parameter of a transmission channel; obtain a phase offset parameter, wherein the phase offset parameter is used to tune clock phase information in the first signal; extract the clock phase information in the first signal based on the first signal, the decision result, the response amplitude parameter, and the phase offset parameter; and determine output clock phase information based on at least three decision results and at least three pieces of clock phase information in at least three symbol periods, wherein the at least three pieces of clock phase information comprises the clock phase information in the first signal.

8. The non-transitory computer-readable storage medium according to claim 7, wherein the program instructions instruct the at least one processor to: determining a decision threshold based on the response amplitude parameter; and deciding the (2M−1) level of the first signal based on the decision threshold to obtain the decision result, wherein the decision result is an element in a preset decision set, and wherein the preset decision set is $\{-(M-1), -(M-2), \ldots, 0, \ldots, +(M-2), +(M-1)\}$.

* * * * *

UNITED STATES PATENT AND TRADEMARK OFFICE
CERTIFICATE OF CORRECTION

PATENT NO. : 11,438,134 B2
APPLICATION NO. : 17/081632
DATED : September 6, 2022
INVENTOR(S) : Yuchun Lu It is certified that error appears in the above-identified patent and that said Letters Patent is hereby corrected as shown below:

In the Claims

In Column 24, In Line 67, In Claim 2, delete "+" and insert -- 0, . . . , + --.

In Column 26, In Line 5, In Claim 5, delete "+" and insert -- 0, . . . , + --.

In Column 26, In Line 15 (Approx.), In Claim 7, delete "(2M 1)" and insert -- (2M-1) --.

Signed and Sealed this
Twelfth Day of September, 2023

Katherine Kelly Vidal
*Director of the United States Patent and Trademark Office*